United States Patent [19]
Watanabe et al.

[11] Patent Number: 5,379,441
[45] Date of Patent: Jan. 3, 1995

[54] HOMEBUS SYSTEM FOR PERMITTING HOMEBUS EQUIPMENT AND ISDN BASIC INTERFACE EQUIPMENT TO USE SAME TWISTED PAIR LINE HOMEBUS

[75] Inventors: Kazuhiro Watanabe, Katano; Naofumi Nakatani, Takatsuki; Masao Ikezaki, Neyagawa, all of Japan

[73] Assignee: Matsushita Electric Industrial Co., Ltd., Osaka, Japan

[21] Appl. No.: 535,055

[22] Filed: Jun. 8, 1990

[30] Foreign Application Priority Data

Jun. 14, 1989 [JP] Japan .................................. 1-151796

[51] Int. Cl.⁵ .......................................... G06F 13/00
[52] U.S. Cl. .................................. 395/800; 395/500;
370/5; 370/6; 364/926.91; 364/927.93;
364/935; 364/DIG. 2; 340/310.01; 340/310.08
[58] Field of Search ............... 395/800, 200, 325, 500;
340/310 R, 310 A; 370/5, 6; 379/100

[56] References Cited

U.S. PATENT DOCUMENTS

| | | | |
|---|---|---|---|
| 3,931,476 | 1/1976 | Matthews | 379/22 |
| 4,434,486 | 2/1984 | Barner, Jr. et al. | 370/110.1 |
| 4,438,434 | 3/1984 | Wason | 340/825.51 |
| 4,562,573 | 12/1985 | Murano et al. | 370/85.1 |
| 4,592,045 | 5/1986 | Fundneider | 370/58.2 |
| 4,792,800 | 12/1988 | Fujioka | 340/825.05 |
| 4,905,237 | 2/1990 | Voelzke | 370/110.1 |
| 4,985,891 | 1/1991 | Fujiwara et al. | 370/110.1 |
| 4,989,202 | 1/1991 | Soto et al. | 370/13 |
| 5,073,921 | 12/1991 | Nomura et al. | 379/100 |
| 5,081,673 | 1/1992 | Engelke et al. | 379/98 |
| 5,142,525 | 8/1992 | Nakatsuma | 370/13 |
| 5,151,972 | 9/1992 | Lorenz et al. | 379/93 |

OTHER PUBLICATIONS

Technical Committee on HBS; "Home Bus System (HBS)"; EIAJ ET-2101; Electronic Industries Association of Japan; both Japanese version published Sep. 1988 and English version published Jan., 1990, pp. 13, 102, and 103.

Ikezaki et al, "Design of Home Bus Controller and Its Application Based on HBS Standard", IEEE, Aug. 1988, pp. 714-722.

Sakon et al, "Telematique Home-Bus System Equipped with Multi-Service Switcher Function", IEEE, Jun. 1989, pp. 597-604.

Electronic Industries Association of Japan, "Home Bus System (HBS)", EIAH ET-2101, pp. 15, 19-22, Jan. 1990.

The International Telegraph and Telephone Consultative Committee, Integrated Services Digital Network (ISDN Overall Network Aspects and Functions, ISDN User-Network Interfaces, vol. III-Fascicle 111.8, Rec. I.430, pp. 204, 205, 209, 14-25 Nov. 1988.

*Primary Examiner*—Thomas C. Lee
*Assistant Examiner*—Paul Harrity
*Attorney, Agent, or Firm*—Stevens, Davis, Miller & Mosher

[57] ABSTRACT

A homebus system for permitting use of a twisted pair line homebus to both homebus equipment and integrated service digital network (ISDN) interface equipment. The homebus system includes a homebus controller for controlling access to the twisted pair line homebus so as to selectively connect and disconnect a digital service unit for communication between a digital network and the ISDN interface equipment connected to said twisted pair line homebus via an information plug socket.

4 Claims, 3 Drawing Sheets

HOMEBUS SYSTEM FOR PERMITTING HOMEBUS EQUIPMENT AND ISDN BASIC INTERFACE EQUIPMENT TO USE SAME TWISTED PAIR LINE HOMEBUS

BACKGROUND OF THE INVENTION

The present invention relates to information plug sockets, automatic terminals and homebus controllers as well as to a homebus system using them.

Referring to FIG. 2, a prior art technique relating thereto will be explained. FIG. 2 is a scheme illustrating the construction in the case where a twist pair line homebus system and an ISDN basic interface system are disposed together in a home, in which reference numeral 201 is a DSU (digital service unit); 202 is an HBC (homebus controller); 203 is a terminal resistor for the ISDN basic interface; 204 is a modular plug socket for the ISDN basic interface; 205 is an information plug socket for the twist pair line homebus; 206 is an ISDN basic interface R line; 207 is an ISDN basic interface T line; 208 is an information channel 1 for the twist pair line homebus; 209 is an information channel 2 for the twist pair line homebus; 210 is an information channel 3 for the twist pair line homebus; and 211 is a control channel for the twist pair line homebus. Heretofore, in the case where a twist pair line homebus equipment and an ISDN basic interface equipment were used in a same home, two kinds of buses were provided, i.e. the twist pair line homebus and the ISDN basic interface bus. When twist pair line homebus equipment was used, the twist pair line homebus equipment was connected with the information plug socket for the twist pair line homebus, while when ISDN basic interface equipment was used, the ISDN basic interface equipment was connected with the modular plug socket for the ISDN basic interface.

By the prior art technique described above, in the case where the twist pair line homebus equipment and the ISDN basic interface equipment are used in the same home, two kind of buses, i.e. the twist pair line homebus and the ISDN basic interface bus, should be provided. Further, there is a problem that, since 8-pin modular plug sockets having a same shape are used in the twist pair line homebus and the ISDN basic interface, erroneous connections, namely, that the twist pair line homebus equipment is connected with the modular plug socket for the ISDN basic interface or that the ISDN basic interface equipment is connected with the information plug socket for the twist pair line homebus, are apt to happen. Therefore, it is considered to use the information channel 1 and the information channel 2 in the twist pair line homebus as the ISDN basic interface bus and to use the ISDN basic interface equipment connected with the twist pair line homebus. In this case, there are problematical points as follows:

(1) The connecting cable between the twist pair line homebus equipment connected with the twist pair line homebus and the information plug socket has bad influences on waveforms transmitted through the ISDN basic interface bus.

(2) Unless each of the information channels 1 and 2 in the twist pair line homebus is terminated with a terminal resistor, the twist pair line homebus cannot be used as the ISDN basic interface bus.

(3) The homebus controller should have a function of detecting a transmission call from the ISDN basic interface equipment and a reception call from the digital service unit and connecting the ISDN basic interface equipment with the digital service unit.

(4) The ISDN basic interface equipment cannot be used, when the homebus controller allocates an information channel 1 or 2 to the homebus equipment from a state where none of the three information channels is used.

SUMMARY OF THE INVENTION

The object of the present invention is to make it possible to use both the twist pair line homebus equipment and the ISDN basic interface equipment by using the twist pair line homebus.

Means for achieving the object described above is as follows:

(1) An information plug socket is provided with a supplied power detecting device for detecting phantom-supplied electric power by using the information channel 1 and the information channel 2 in the twist pair line homebus; a twist pair line modular plug socket; a consumed power detecting device for detecting electric power consumption by equipment connected with the twist pair line modular plug socket; and a relay for connecting the information channel 1 and the information channel 2 to the twist pair line modular plug socket; wherein the supplied power detecting device described above detects phantom-supplied electric power by using the information channel 1 and the information channel 2 in the twist pair line homebus; and the information plug socket is constructed so as to disconnect the information channel 1 and the information channel 2 from the twist pair line modular plug socket, in the case where the consumed power detecting device described above cannot detect electric power consumption by the equipment.

(2) An automatic terminator is provided with a supplied power detecting device for detecting phantom-supplied electric power by using the information channel 1 and the information channel 2 in the twist pair line homebus; a relay; and a terminal resistor; wherein the automatic terminator is so constructed that the relay described above connects the information channel 1 and the information channel 2 with the terminal resistor, in the case where the supplied power detecting device described above detects phantom-supplied electric power by using the information channel 1 and the information channel 2.

(3) A homebus controller is provided with a digital service unit; an INFO 1 signal detector; an INFO 2 signal detector; a cross point; and a control section; wherein the control section described above controls the cross point, and wherein the homebus controller is constructed so as to connect the information channel 1 with the R line in the digital service unit and the information channel 2 with the T line in the digital service unit, in the case where neither the information channel 1 nor the information channel 2 in the twist pair line homebus is used and the INFO 1 signal detector described above detects an INFO 1 signal from the information channel 2 and in the case where the INFO 2 signal detector described above detects an INFO 2 signal on the R line in the digital service unit and neither the information channel 1 nor the information channel 2 is used.

(4) A homebus controller is constructed so as to allocate the information channel 3 to a homebus equipment, in the case where the homebus equipment demands an information channel in the state where none of the three information channels is used.

(5) A homebus system according to another embodiment comprises an information plug socket provided with a supplied power detecting device for detecting phantom-supplied electric power by using the information channel 1 and the information channel 2 in the twist pair line homebus; a twist pair line modular plug socket; a consumed power detecting device for detecting electric power consumption by equipment connected with the twist pair line modular plug socket; and a relay for connecting the information channel 1 and the information channel 2 to the twist pair line modular plug socket; wherein the supplied power detecting device described above detects phantom-supplied electric power by using the information channel 1 and the information channel 2 in the twist pair line homebus; and the information plug socket is constructed so as to disconnect the information channel 1 and the information channel 2 from the twist pair line modular plug socket, in the case where the consumed power detecting device described above cannot detect electric power consumption by the equipment; a homebus controller provided with a digital service unit; an INFO 1 signal detector; an INFO 2 signal detector; a cross point; and a control section; wherein the control section described above controls the cross point, and wherein the homebus controller is constructed so as to connect the information channel 1 with the R line in the digital service unit and the information channel 2 with the T line in the digital service unit, in the case where neither the information channel 1 nor the information channel 2 is used and the INFO 1 signal detector described above detects an INFO 1 signal from the information channel 2 and in the case where the INFO 2 signal detector described above detects an INFO 2 signal on the R line in the digital service unit and neither the information channel 1 nor the information channel 2 is used; and a homebus controller constructed so as to allocate the information channel 3 to a homebus equipment, in the case where the homebus equipment demands an information channel in a state where none of the three information channels is used; wherein the homebus controller is composed of the information plug socket, the homebus controller, the terminal resistor, and the twist pair line homebus described above so as to use the information channel 1 and the information channel 2 as an ISDN basic interface bus.

(6) A homebus system according to another embodiment comprises an automatic terminator provided with a supplied power detecting device for detecting phantom-supplied electric power by using the information channel 1 and the information channel 2 in the twist pair line homebus; a relay; and a terminal resistor; wherein the automatic terminator is so constructed that the relay described above connects the information channel 1 and the information channel 2 with the terminal resistor, in the case where the supplied power detecting device described above detects phantom-supplied electric power by using the information channel 1 and the information channel 2; and a homebus controller provided with a digital service unit; an INFO 1 signal detector; an INFO 2 signal detector; a cross point; and a control section; wherein the control section described above controls the cross point, and the homebus controller is constructed so as to connect the information channel 1 with the R line in the digital service unit and the information channel 2 with the T line in the digital service unit, in the case where neither the information channel 1 nor the information channel 2 is used and the INFO 1 signal detector described above detects an INFO 1 signal from the information channel 2 and in the case where the INFO 2 signal detector described above detects an INFO 2 signal on the R line in the digital service unit and neither the information channel 1 nor the information channel 2 is used; and the homebus controller is constructed so as to allocate the information channel 3 to a homebus equipment, in the case where the homebus equipment demands an information channel in a state where none of the three information channels is used; wherein the homebus controller is composed of the information plug socket, the homebus controller, the automatic terminator, and the twist pair line homebus described above so as to use the information channel 1 and the information channel 2 as an ISDN basic interface bus.

DESCRIPTION OF THE PREFERRED EMBODIMENTS

Figure 1:
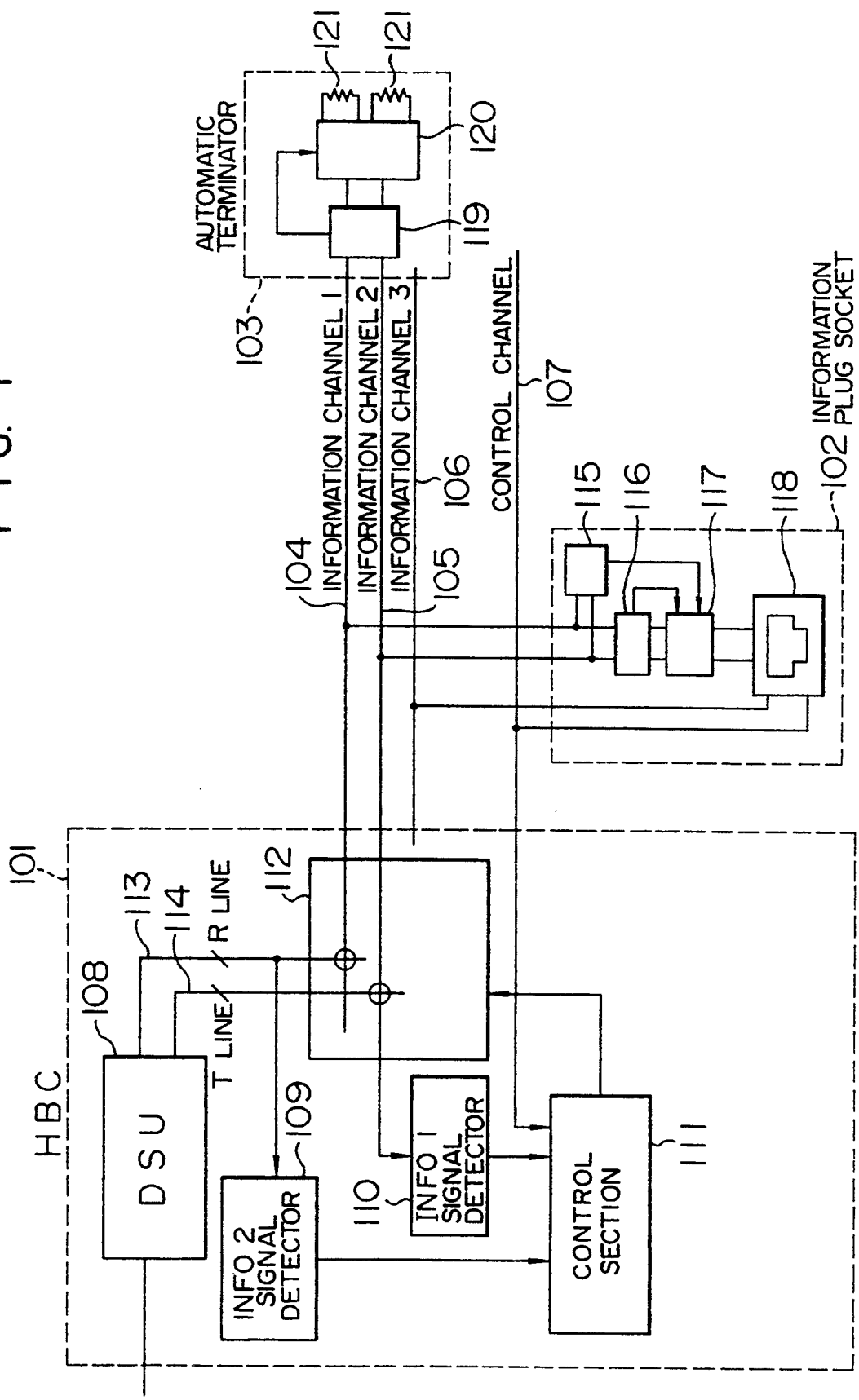
FIG. 1 is a block diagram showing the construction of an embodiment of the homebus system, to which the present invention is applied.
Figure 2:
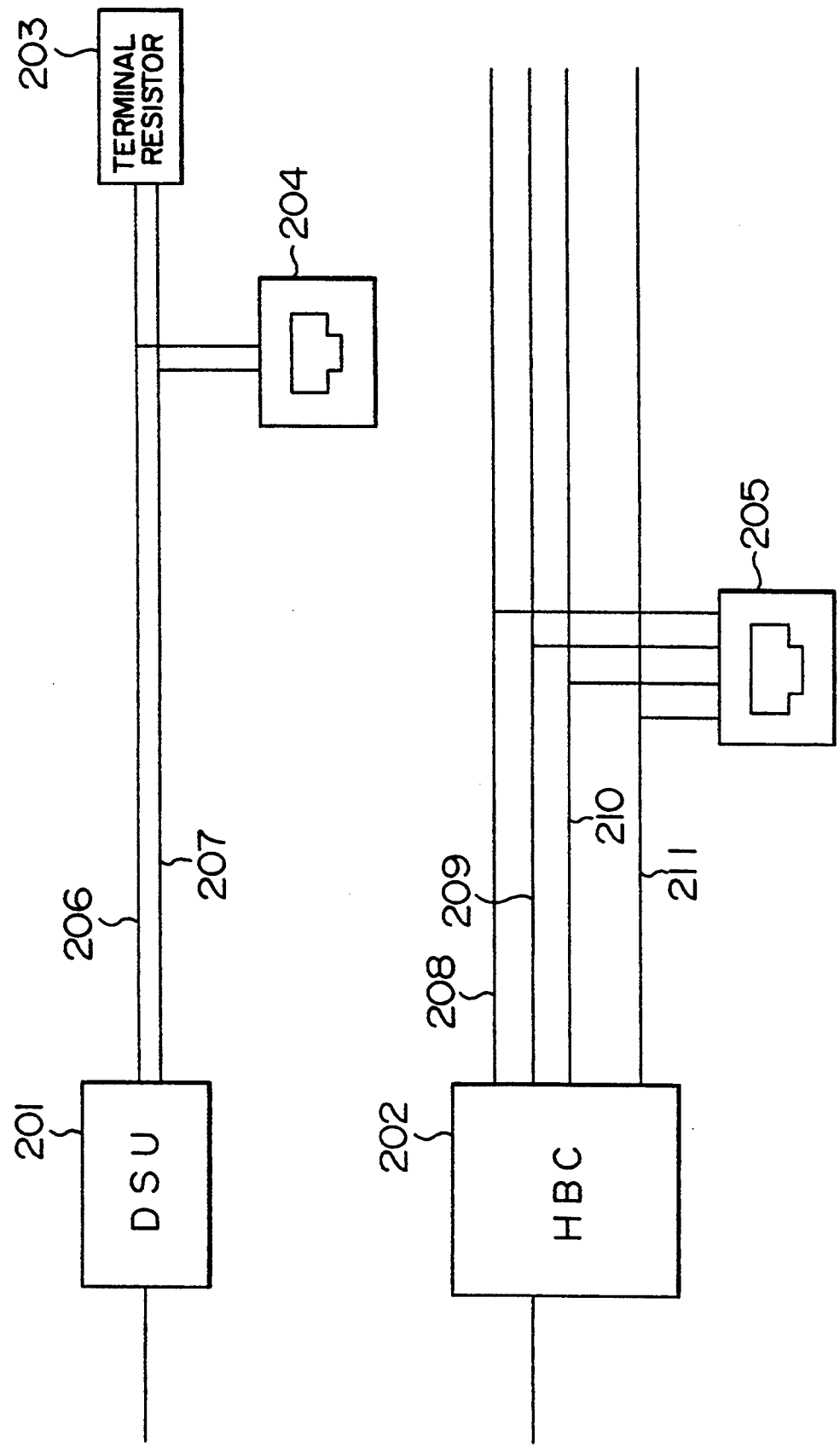
FIG. 2 is a block diagram showing the prior art construction, in the case where a twist pair line homebus system and an ISDN basic interface system are disposed together in a home.

The reason why the effects of the present invention are achieved by the invention will be explained.

(1) The reason why it is possible to prevent influences of the connecting cable between the twist pair line homebus equipment and the information plug socket connected with the twist pair line homebus on the transmitted waveform in the ISDN basic interface bus by constructing the information plug socket as described will be explained.

(a) In the case where the information channel 1 and the information channel 2 in the twist pair line homebus are not used as the ISDN basic interface bus, since no phantom power supply to the information channel 1 and the information channel 2 is effected and consequently the supplied electric power detecting device can detect no power supply, the relay connects the information channel 1 and the information channel 2 described above with the twist pair line modular plug socket, and thus both the twist pair line homebus equipment and the ISDN basic interface equipment are connected with the information channel 1 and the information channel 2 described above. Therefore, it is possible to effect communication through the twist pair line homebus equipment using the information channels.

(b) In the case where the information channel 1 and the information channel 2 in the twist pair line homebus are used as the ISDN basic interface bus, phantom power supply to the information channel 1 and the information channel 2 is effected. Since the supplied electric power detecting device detects this supplied electric power in the information channels with which the twist pair line homebus equipment is connected, while no electric power from the information channels is consumed in the twist pair line homebus equipment, the consumed electric power detecting device detects no electric power consumption by the equipment, and the relay disconnects the information channel 1 and the information channel 2 from the twist pair line modular plug socket. In this way the connecting cable between the twist pair line homebus equipment and the information plug socket is kept from influencing the transmitted waveform in the ISDN basic interface bus. On the other hand, since the supplied electric power detecting device detects supplied electric power in the information plug socket with which the ISDN basic interface equipment is connected, it is detected that the ISDN basic interface equipment has been connected with the bus. Thus the consumed electric power detecting device detects electric power consumed by the equipment, and the relay connects the information channel 1 and the information channel 2 with the twist pair line modular plug socket. Consequently, the ISDN basic interface equipment is connected with the information channel 1 and the information channel 2 described above used as the ISDN basic interface bus.

(2) The reason why the termination is effected automatically, in the case where the information channel 1 and the information channel 2 in the twist pair line homebus are used as the ISDN basic interface bus, by constructing the automatic terminator as described, will be explained.

(a) in the case where the information channel 1 and the information channel 2 in the twist pair line homebus are not used as the twist pair line homebus, since no phantom power supply to the information channel 1 and the information channel 2 is effected and consequently the supplied electric power detecting device can detect no power supply, the relay disconnects the terminal resistor from the information channel 1 and the information channel 2. In this way the information channel 1 and the information channel 2 described above can be used as the twist pair line homebus.

(b) In the case where the information channel 1 and the information channel 2 in the twist pair line homebus are used as the ISDN basic interface bus, a phantom power supply to the information channel 1 and the information channel 2 is effected. Since the supplied electric power detecting device detects this supplied electric power in the information channels, the relay connects the information channel 1 and the information channel 2 with the terminal resistor. In this way, the information channel 1 and the information channel 2 can be used as the ISDN basic interface bus.

(3) The reason why the transmission call from the ISDN basic interface equipment connected with the information channel 1 and the information channel 2 in the twist pair line homebus and the reception call to the ISDN basic interface equipment are made possible by constructing the homebus controller as described will be explained.

(a) Transmission call procedure

It is supposed that the ISDN basic interface equipment is connected with the information plug socket and that a start demand is transmitted. In the case where the ISDN basic interface equipment transmits the start demand, in order to transmit the INFO 1 signal to the T line, the INFO 1 signal is transmitted in the information channel 2, and this is detected by the INFO 1 signal detector, of which the control section is informed. If neither the information channel 1 nor the information channel 2 is used, the control section connects the cross point and connects also the information channel 1 and the information channel 2 with the R line and the T line, respectively, in the digital service unit. Thereafter a communication link is established between the digital service unit and the ISDN basic interface equipment, and communication is executed therebetween.

(b) Reception call procedure

In the case where a signal is received from an ISDN network, the digital service unit transmits the INFO 2 signal to the R line. This signal is detected by the INFO 2 signal detector, which informs the control section thereof. If neither the information channel 1 nor the information channel 2 is used, the control section connects the cross point and connects also the information channel 1 and the information channel 2 with the R line and the T line, respectively, in the digital service unit. Thereafter, in the same way as in the transmission call procedure, a communication link is established between the digital service unit and the ISDN basic interface equipment, and communication is executed therebetween.

(4) By constructing the homebus controller as described, it is not necessary for the homebus controller to allocate the information channel 1 or the information channel 2 to the homebus equipment from the state where none of the three information channels is used.

(5) The reason why it is made possible to use both the twist pair line homebus equipment and the ISDN basic interface equipment, using the twist pair line homebus, and why it is further possible to prevent the connecting cable between the twist pair line homebus equipment and the information plug socket from influencing the transmitted waveform in the ISDN basic interface bus, by constructing the homebus system as described, will be explained. The transmission procedure from the ISDN basic interface equipment connected with the twist pair line homebus system constructed as described will be explained. At first, as the initial state, it is supposed that the information channel 1 and the information channel 2 in the twist pair line homebus are not used as the R line and the T line, respectively, in the ISDN basic interface. At this time, the cross point is not connected, and the R line and the T line in the digital service unit are not connected with the information channel 1 and the information channel 2, respectively. Further, since the supplied electric power detecting device in the information plug socket cannot detect any phantom supplied electric power on the information channels 1 and 2, the relay connects the twist pair line modular plug socket with the information channels 1 and 2. That is, in this state, the information channel 1 and the information channel 2 are used as usual information channels in the twist pair line homebus. Now it is supposed that the ISDN basic interface equipment is connected with the information plug socket and it transmits a start demand. In the case where the ISDN basic interface equipment transmits the start demand, in order to transmit the INFO 1 signal to the T line, the INFO 1 signal is transmitted to the information channel 2, which is detected by the INFO 1 signal detector, and the control section is informed thereof. If neither the information channel 1 nor the information channel 2 is used, the control section connects the cross point and connects also the information channel 1 and the information channel 2 with the R line and the T line, respectively, in the digital service unit. Thereafter a communication link is established between the digital service unit and the ISDN basic interface equipment, and communication is executed. The phantom power supply is effected by the digital service unit to the R line and the T line in the digital service unit. This electric power is transferred by the information channel 1 and the information channel 2. The supplied electric power detecting device in the information plug socket detects the phantom supplied electric power in the information channels 1 and 2. In the case where the consumed electric power detecting device can detect no consumption of the phantom electric power supplied by the equipment connected with the information plug socket, i.e. in the case where the equipment connected with the information plug socket is the twist pair line homebus equipment, the relay disconnects the information channels 1 and 2 from the twist pair line modular plug socket to remove influences of the connecting cable between the twist pair line homebus equipment and the twist pair line modular plug socket on the waveform of the signal in the ISDN basic interface bus. Next, the reception procedure to the ISDN basic interface equipment will be explained. Similarly to the transmission procedure, it is supposed that the information channels 1 and 2 are not used as the ISDN basic interface bus in the initial state. In the case where the reception is effected from the ISDN network, the digital service unit transmits the INFO 2 signal to the R line. The INFO 2 signal detector detects this signal, and the control section is informed thereof. If neither the information channel 1 nor the information channel 2 is used, the control section connects the cross point and also connects the information channel 1 and the information channel 2 with the R line and the T line, respectively, in the digital service unit. Thereafter a communication link is established between the digital service unit and the ISDN basic interface equipment, similarly to the transmission procedure and communication is executed. Next, the stop procedure that is, the procedure, by which the information channels 1 and 2 are changed to the state where they are not used as the ISDN basic interface passive bus, but used as the original twist pair line homebus, will be explained. It is supposed as the initial state that the communication link is established between the digital service unit and the ISDN basic interface equipment and the communication is effected. When the communication is terminated and the system enters in the stopped state, there are no signals on the R line in the digital service unit. This is detected by the INFO 2 signal detector, and the control section is informed thereof. The control section disconnects the cross point and also disconnects the information channel 1 and the information channel 2 from the R line and the T line, respectively, in the digital service unit. In this way, since the supplied electric power detecting device in the information plug socket cannot detect the phantom electric power supplied to the information channels 1 and 2, the relay connects the information channels 1 and 2 with the twist pair line modular plug socket, and the information channels 1 and 2 can be used also from the twist pair line homebus equipment.

(6) The reason why both the twist pair line homebus equipment and the ISDN basic interface equipment can be used by using the twist pair line homebus, and further why the termination can be effected automatically, in the case where the information channel 1 and the information channel 2 in the twist pair line homebus are used as the ISDN basic interface bus, by constructing the homebus system as described, will be explained. The transmission procedure from the ISDN basic interface equipment connected with the twist pair line homebus system constructed as described will be explained. At first, for the initial state, it is supposed that the information channels 1 and 2 in the twist pair line homebus are not used as the R line and the T line in the ISDN basic interface. At this time, the cross point is not connected, and the information channels 1 and 2 are not connected with the R line and the T line, respectively, in the digital service unit. Further, since the supplied electric power detecting device in the automatic terminator cannot detect the phantom electric power supplied to the information channels 1 and 2, the relay connects neither the information channel 1 nor the information channel 2 with the terminal resistor. That is, in this state, the information channel 1 and the information channel 2 are used as the usual information channels in the twist pair line homebus. Now it is supposed that the ISDN basic interface equipment is connected with the information plug socket and that it has transmitted a start demand. In the case where the ISDN basic interface equipment transmits the start demand, since the INFO 1 signal is transferred to the T line, the INFO 1 signal is transmitted to the information channel 2, which is detected by the INFO 1 signal detector, and the control section is informed thereof. If neither the information channel 1 nor the information channel 2 is used, the control section connects the cross point and also connects the information channel 1 and the information channel 2 with the R line and the T line, respectively, in the digital service unit. Thereafter, a communication link is established between the digital service unit and the ISDN basic interface equipment, and communication is executed. Further, at this time, the phantom electric power is supplied by the digital service unit to the R line and the T line in the digital service unit. This electric power is transferred through the information channel 1 and the information channel 2. The supplied electric power detecting device in the automatic terminator detects the phantom electric power supplied to the information channels 1 and 2, and the relay connects the information channel 1 and the information channel 2 with the terminal resistor. The termination of the ISDN basic interface passive bus is executed in this way. Next, the reception procedure to the ISDN basic interface equipment will be explained. For the initial state, it is supposed, similarly to the transmission procedure, that the information channels 1 and 2 are not used as the ISDN basic interface bus. In the case where a signal is received from the ISDN network, the digital service unit transmits the INFO 2 signal to the R line. The INFO 2 signal detector detects this signal, and the control section is informed thereof. If neither the information channel 1 nor the information channel 2 is used, the control section connects the cross point and also connects the information channel 1 and the information channel 2 with the R line and the T line, respectively, in the digital service unit. Thereafter a communication link is established between the digital service unit and the ISDN basic interface equipment, similarly to the transmission procedure, and communication is executed. Next, the stop procedure, that is, the procedure, by which the information channels 1 and 2 are changed to the state where they are not used as the ISDN basic interface passive bus, but used as the original twist pair line homebus, will be explained. It is supposed as the initial state that the communication link is established between the digital service unit and the ISDN basic interface equipment and that communication is effected. When the communication is terminated and the system enters the stopped state, there are no signals on the R line in the digital service unit. This is detected by the INFO 2 signal detector and the control section is informed thereof. The control section disconnects the cross point and also disconnects the information channel 1 and the information channel 2 from the R line and the T line, respectively, in the digital service unit. In this way, since the supplied electric power detecting device in the information plug socket cannot detect the phantom electric power supplied to the information channels 1 and 2, the relay disconnects the information channel 1 and the information channel 2 from the terminal resistor.

Embodiments

Now several cases where the present invention is applied to the homebus system will be explained, referring to FIGS. 1, 3A and 3B.

Figure 3A:
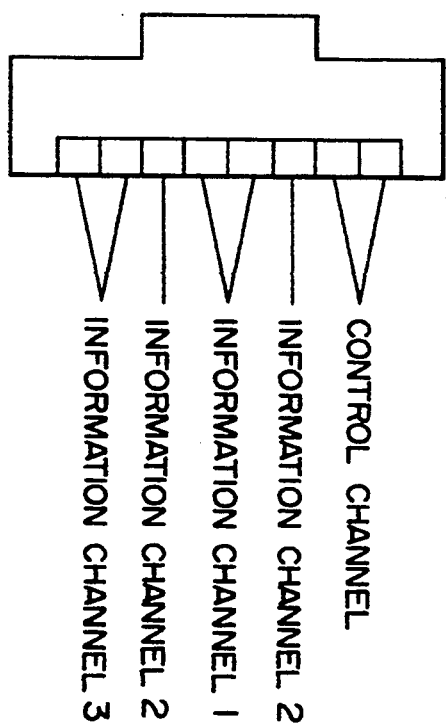
FIGS. 3A and 3B are schemes indicating the known arrangement of pins in a twist pair line homebus information plug socket and an ISDN basic interface plug socket, respectively.
Figure 3B:
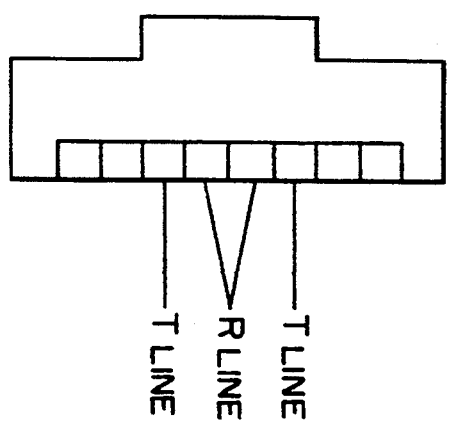

FIG. 1 is a block diagram showing the construction of an embodiment of the homebus system to which the present invention is applied, and FIGS. 3A and 3B are schemes indicating the arrangement of pins in a twist pair line homebus information plug socket and an ISDN basic interface plug socket, respectively. In FIG. 1, reference numeral 101 is an HBC (homebus controller); 102 is an information plug socket; 103 is an automatic terminator; 104 is an information channel 1 in the twist pair line homebus; 105 is an information channel 2 in the twist pair line homebus; 106 is an information channel 3 in the twist pair line homebus; 107 is a control channel in the twist pair line homebus; 108 is a DSU (digital service unit); 109 is a signal detector; 110 is an INFO 1 signal detector; 111 is a control section; 112 is a cross point; 113 is an ISDN basic interface R line; 114 is an ISDN basic interface T line; 115 is a supplied electric power detecting device; 116 is a consumed electric power detecting device; 117 is a relay; 118 is a twist pair line modular plug socket; 119 is a supplied electric power detecting device; 120 is a relay; and 121 is a terminal resistor. FIG. 3A is a scheme indicating the arrangement of pins in the twist pair line homebus information plug socket, and FIG. 3B is a scheme indicating the arrangement of pins in the ISDN basic interface plug socket. At first, the arrangement of pins in the twist pair line homebus information plug socket and the arrangement of pins in the ISDN basic interface plug socket will be explained. As indicated in FIGS. 3A and 3B, 8-pin modular plug sockets having a same shape are used in the twist pair line homebus and the ISDN basic interface. Further, the pin position for the information channel 1 in the twist pair line homebus is identical to the pin position for the R line in the ISDN basic interface, and the pin position for the information channel 2 in the twist pair line homebus is identical to the pin position for the T line in the ISDN basic interface. Consequently, if the twist pair line homebus is so constructed that the information channels 1 and 2 in the twist pair line homebus can be used as the R line and the T line, respectively, in the ISDN basic interface, transmission and reception from and to the ISDN basic interface equipment connected with the information plug socket in the twist pair line homebus are made possible. Next the transmission procedure from the ISDN basic interface equipment connected with the twist pair line homebus system constructed as indicated in FIG. 1 will be explained. At first, for the initial state, it is supposed that the information channels 1 and 2 (104 and 105) in the twist pair line homebus are not used as the R line and the T line in the ISDN basic interface. At this time the cross point (112) is not connected, and the R line (113) and the T line (114) in the DSU (108) are not connected with the information channel 1 (104) and the information channel 2 (105), respectively. Further, since the supplied electric power detecting device (119) in the automatic terminator (103) cannot detect the phantom electric power supplied to the information channels 1 and 2 (104 and 105), the relay (120) connects neither the information channel 1 (104) nor the information channel 2 (105) with the terminal resistor (121). Still further, since the supplied electric power detecting device (115) in the information plug socket (102) cannot detect the phantom electric power supplied to the information channels 1 and 2 (104 and 105), the relay (117) connects the information channels 1 and 2 (104 and 105) with the twist pair line modular plug socket (118). That is, in this state, the information channel 1 (104) and the information channel 2 (105) are used as usual information channels in the twist pair line homebus. Now it is supposed that the ISDN basic interface equipment is connected with the information plug socket (102) and transmits a start demand. In the case where the ISDN basic interface equipment transmits the start demand, in order to transfer the INFO 1 signal through the T line, the INFO 1 signal is transmitted to the information channel 2 (105). The INFO 1 signal detector (110) detects this signal, and the control section (111) is informed thereof. If neither the information channel 1 (104) nor the information channel 2 (105) is used, the control section (111) connects the cross point (112) and also connects the information channel 1 (104) and the information channel 2 (105) with the R line (113) and the T line (114), respectively, in the DSU (108). Thereafter a communication link is established between the DSU (108) and the ISDN basic interface equipment, and communication is executed. Further, at this time, the phantom power supply is effected by the DSU (108) to the R line (113) and the T line (114) in the DSU (108). This electric power is transferred by the information channel 1 (104) and the information channel 2 (105). The supplied electric power detecting device (119) in the automatic terminator (103) detects the phantom electric power supplied to the information channels 1 and 2 (104 and 105), and the relay (120) connects the information channel 1 (104) and the information channel 2 (105) with the terminal resistor (121). In this way, the ISDN basic interface passive bus is terminated. Further, the supplied electric power detecting device (115) in the information plug socket (102) detects the phantom electric power supplied to the information channels 1 and 2 (104 and 105). In addition, in the case where the consumed electric power detecting device (118) cannot detect the consumption of the supplied phantom electric power by the equipment connected with the information plug socket (102), i.e., in the case where the equipment connected with the information plug socket (102) is the twist pair line homebus equipment, the relay (117) disconnects the information channels 1 and 2 (104 and 105) from the twist pair line modular plug socket (118) to remove the influences of the connecting cable between the twist pair line homebus equipment and the twist pair line modular plug socket on the signal waveform in the ISDN basic interface bus. Next the reception procedure to the ISDN basic interface equipment will be explained. For the initial state it is supposed that the information channels 1 and 2 (104 and 105) are not used as the ISDN basic interface bus, similarly to the transmission procedure. In the case where a signal is received from the ISDN network, the DSU (108) transmits the INFO 2 signal to the R line (113). The INFO 2 signal detector (109) detects this signal, and the control section (111) is informed thereof. If neither the information channel 1 (104) nor the information channel 2 (105) is used, the control section (111) connects the cross point (112) and also connects the information channel 1 (104) and the information channel 2 (105) with the R line (113) and the T line (114), respectively, in the DSU (108). Thereafter, similarly to the transmission procedure, a communication link is established between the DSU (108) and the ISDN basic interface equipment, and communication is executed. Next, the stop procedure, that is, the procedure by which the information channels 1 and 2 (104 and 105) are changed to the state where they are not used as the ISDN basic interface passive bus, but instead used as the original twist pair line homebus, will be explained. It is supposed as the initial state that the communication link is established between the DSU (108) and the ISDN basic interface equipment and the communication is effected. When the communication is terminated and the system enters the stopped state, there are no signals on the R line (113) in the DSU (108). This is detected by the INFO 2 signal detector (109) and the control section (111) is informed thereof. The control section (111) disconnects the cross point (112) and also disconnects the information channel 1 (104) and the information channel 2 (105) from the R line (113) and the T line (114), respectively, in the DSU (108). In this way, since the supplied electric power detecting device (119) in the automatic terminator (103) cannot detect the phantom electric power supplied to the information channels 1 and 2 (104 and 105), the relay (120) disconnects the information channel 1 (104) and the information channel 2 (102) from the terminal resistor (121). Further, since the supplied electric power detecting device (115) in the information plug socket (102) cannot detect the phantom electric power supplied to the information channels 1 and 2 (104 and 105), the relay (117) connects the information channels 1 and 2 (104 and 105) with the twist pair line modular plug socket (118), and thus the information channels 1 and 2 (104 and 105) can also be used for the twist pair line homebus equipment.

Effects of the Invention (1) By constructing the information plug socket as described, an effect is obtained that it is possible to prevent for the connecting cable between the twist pair line homebus equipment connected with the twist pair line homebus and the information plug socket from influencing the transmitted waveform in the ISDN basic interface bus.

(2) By constructing the automatic terminator as described, an effect is obtained that the termination can be effected automatically, in the case where the information channel 1 and the information channel 2 in the twist pair line homebus are used as the ISDN basic interface bus.

(3) By constructing the homebus controller as described, an effect is obtained that the transmission call from the ISDN basic interface equipment connected with the information channel 1 and the information channel 2 in the twist pair line homebus and the reception call to the ISDN basic interface equipment can be implemented, as described above.

(4) By constructing the homebus controller as described, the homebus controller can be prevented from allocating the information channel 1 or the information channel 2 to the homebus equipment from the state where none of the three information channels is used, and as a result, avoiding a situation in which the ISDN basic interface equipment cannot be used.

(5) By constructing the homebus system as described, an effect is obtained that both the twist pair line homebus equipment and the ISDN basic interface equipment can be used by means of the twist pair line homebus and that it is possible to prevent the connecting cable between the twist pair line homebus equipment and the information plug socket from influencing the transmitted waveform in the ISDN basic interface bus.

(6) By constructing the homebus system as described, an effect is obtained that both the twist pair line homebus equipment and the ISDN basic interface equipment can be used by means of the twist pair line homebus and that the termination can be effected automatically, in the case where the information channel 1 and the information channel 2 in the twist pair line homebus are used as the ISDN basic interface bus.

We claim:

1. A homebus controller for controlling a twisted pair line homebus and homebus equipment attached to said twisted pair line homebus and for selectively permitting communication between a digital network and digital network interface equipment attached to said twisted pair line homebus, said twisted pair line homebus having a control channel and a plurality of information channels including at least a first information channel and a second information channel, said homebus controller comprising:

a digital service unit for communicating with said digital network, said digital service unit having an R line for outputting digital data to said digital network interface equipment and a T line for inputting digital data from said digital network interface equipment;

a cross point for selectively connecting said R line and said T line of said digital service unit to said first and second information channels of said twisted pair line homebus respectively, thereby selectively permitting said communication between said digital network and said digital network interface equipment through said digital service unit and said first and second information channels of said twisted pair line homebus;

an INFO 1 signal detector for detecting an INFO 1 signal from said second information channel of said twisted pair line homebus;

an INFO 2 signal detector for detecting an INFO 2 signal from said R line of said digital service unit; and a control section for detecting, through said control channel, whether or not each of said first and second information channels of said twisted pair line homebus is used by said homebus equipment attached to said twisted pair line homebus, for controlling said cross point to connect said R line and said T line of said digital service unit to said first and second information channels of said twisted pair line homebus respectively when at least one of said INFO 1 signal detector and said INFO 2 signal detector detects one of said INFO 1 signal and said INFO 2 signal and neither said first information channel nor said second information channel is used by said homebus equipment, and for controlling said cross point to disconnect said R line and said T line of said digital service unit from said first and second information channels of said twisted pair line homebus otherwise.

2. A homebus controller according to claim 1, wherein said plurality of information channels of said twisted pair line homebus further includes a third information channel, and wherein said homebus controller further comprises:

means for allocating said third information channel to said homebus equipment when said homebus equipment demands to communicate with one of said plurality of information channels in a case where none of said first, second and third information channels is used by any other homebus equipment;

said first and said second information channels being left available for said communication between said digital network and said digital interface equipment when said homebus equipment requires only one of said plurality of information channels.

3. A homebus system comprising:

(a) a twisted pair line homebus having a control channel and a plurality of information channels including a first information channel and a second information channel;

(b) at least one information plug socket for selectively connecting equipment to said twisted pair line homebus, said information plug socket including:

(i) a twisted pair line modular plug socket for connection to said equipment;

(ii) a first supplied power detecting device for detecting phantom-supplied electric power on said first and second information channels;

(iii) a consumed power detecting device for detecting consumption of said phantom-supplied electric power by said equipment; and (iv) a relay for connecting said first and second information channels to said twisted pair line modular plug socket in one of a case where said first supplied power detecting device does not detect said phantom-supplied electric power and a case where said consumed power detecting device detects said consumption of said phantom-supplied electric power by said equipment, and for disconnecting said first and second information channels from said twisted pair line modular plug socket in a case where said first supplied power detecting device detects said phantom-supplied electric power and said consumed power detecting device does not detect said consumption of said phantom-supplied electric power by said equipment;

(c) an automatic terminator including:

(i) terminal resistors;

(ii) a second supplied power detecting device for detecting said phantom-supplied electric power on said first and second information channels; and (iii) a relay for connecting said first and second information channels to said terminal resistors respectively when said second supplied power detecting device detects said phantom-supplied electric power, and for disconnecting said first and second information channels from said terminal resistors when said second supplied power detecting device does not detect said phantom-supplied electric power; and (d) a homebus controller for controlling said twisted pair line homebus and homebus equipment connected to said twisted pair line homebus through said at least one information plug socket and for selectively permitting communication between a digital network and digital network interface equipment connected to said twisted pair line homebus through said at least one information plug socket, said homebus controller including:

(i) a digital service unit for communicating with said digital network, said digital service unit having an R line for outputting digital data to said digital network interface equipment and a T line for inputting digital data from said digital network interface equipment;

(ii) a cross point for selectively connecting said R line and said T line of said digital service unit to said first and second information channels of said twisted pair line homebus respectively, thereby selectively permitting said communication between said digital network and said digital network interface equipment through said digital service unit, said first and second information channels of said twisted pair line homebus and said at least one information plug socket;

(iii) an INFO 1 signal detector for detecting an INFO 1 signal from said second information channel of said twisted pair line homebus;

(iv) an INFO 2 signal detector for detecting an INFO 2 signal from said R line of said digital service unit; and (v) a control section for detecting, through said control channel, whether or not each of said first and second information channels of said twisted pair line homebus is used by said homebus equipment connected to said twisted pair line homebus through said at least one information plug socket, for controlling said cross point to connect said R line and said T line of said digital service unit to said first and second information channels of said twisted pair line homebus respectively when at least one of said INFO 1 signal detector and said INFO 2 signal detector detects one of said INFO 1 signal and said INFO 2 signal and neither said first information channel nor said second information channel is used by said homebus equipment, and for controlling said cross point to disconnect said R line and said T line of said digital service unit from said first and second information channels of said twisted pair line homebus otherwise.

4. A homebus system according to claim 3, wherein said plurality of information channels of said twisted pair line homebus further includes a third information channel, and wherein said homebus controller further includes:

means for allocating said third information channel to said homebus equipment when said homebus equipment demands to communicate with one of said plurality of information channels in a case where none of said first, second and third information channels is used by any other homebus equipment;

said first and said second information channels being left available for said communication between said digital network and said digital network interface equipment when said homebus equipment requires use of only one of said plurality of information channels.

* * * * *